Sept. 26, 1933.        A. J. MICHELIN        1,928,068

WHEEL FOR MOTOR VEHICLES AND THE LIKE

Filed July 22, 1930

Inventor
André Jules Michelin,

By Wilkinson & Mawhinney
Attorneys.

Patented Sept. 26, 1933

1,928,068

UNITED STATES PATENT OFFICE 1,928,068

WHEEL FOR MOTOR VEHICLES AND THE LIKE

André Jules Michelin, Paris, France, assignor to Michelin Et Cie., Clermont-Ferrand, France, a corporation of France Application July 22, 1930, Serial No. 469,846, and in France July 25, 1929

5 Claims. (Cl. 301—9)

The present invention relates to wheels for motor vehicles and the like, and has more particular reference to an improved means for detachably securing the body part of the wheel to the hub or hub flange.

An object of the present invention is to provide the improved construction of wheel body and fastening bolt or binding member, which not only insures the proper centering and retention of the wheel body on the hub, but to also provide means for taking up the strain incident to the transmission of pressure between the hub and wheel body either in driving or braking of the vehicle, and to provide an abutment device which cooperates with an improved structure of socket in the wheel body for maintaining the abutment device at the proper tension, and preventing accidental displacement of the abutment device incident to vibration and the like.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a fragmentary sectional view taken through an abutment device in the form of a nut, showing an exterior base for binding engagement against the socket of the wheel body.

Figure 3:
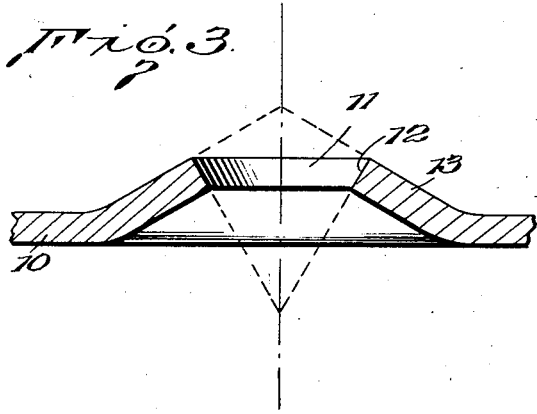
Figure 3 is a detail sectional view taken through a portion of the wheel body, showing the socket formation against which the abutment is adapted to work.

Referring first to Figure 3, the invention is applicable to wheels, the body portions of which are adapted to be demountably attached to the hub or hub part, and the wheel body is provided with a sheet metal portion 10, which may comprise the entire body of the wheel, or merely a flanged part carried thereby in certain constructions of wheels. The sheet metal body part 10 is provided with an opening 11 therethrough adapted to receive a bolt, or the like. The opening or aperture 11 is provided with a marginal edge portion or wall 12, which flares or inclines outwardly so that the wall 12, as shown by the dotted lines, is substantially frusto-conical. The apertured portion of the metallic part 10 is pressed or raised outwardly, as shown at 13, to provide a bearing, compressible or yieldable boss, against which the head of the bolt, the nut, or other suitable abutment is adapted to operate for yieldably binding the parts together. It will be noted that the boss 13 is raised to a suitable height, and at such inclination that the inclined wall 12 lies at substantially right angles to the wall of the boss 13 for the purpose of transmitting pressure directly against the inclined wall 12, and in an edgewise direction through the wall of the boss 13 to offset cracking, splitting, or other damaging actions of the pressure upon the wall of the boss.

Figure 4:
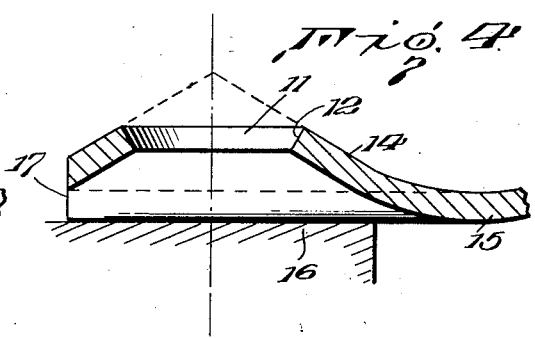
Figure 4 is a similar view showing a slight modification in the structure of the same.
Figure 5:
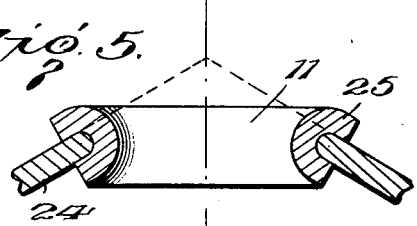
Figure 5 is a like view showing a further modification wherein the bushing or wearing ring is employed.

In Figure 4, the slight modification shows the boss 14 stamped or pressed upwardly from the sheet metal wheel body 15, and shows the hub or supporting section 16 with a relatively flat face, against which the wheel body is adapted to rest. The wheel body 15 is provided with a central aperture having a rectangularly disposed edge wall 17 extending at right angles from the supporting hub 16, and from which the boss 14 is raised, the wall of the boss being interrupted by the wall 17. The structure in Figure 4 shows the opening 11 adjacent the hub opening or wall 17, whereas in Figure 3, the opening 11 is located outwardly from the hub at an intermediate point, and wherein the wheel body is constructed of sheet steel, or the like.

Figure 2:
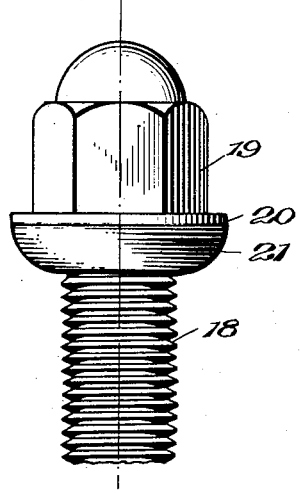
Figure 2 is a side elevation of a slightly modified form of the invention, wherein the nut comprises the head or outer end of the bolt or pin used for fastening the body part of the wheel to the hub.

As shown in Figure 2, a bolt may be employed for passage through the opening 11. The bolt has a threaded shank 18 adapted to be threaded in the hub or hub flange in the usual manner. The shank 18 is provided with an angularly faced head 19 upon its outer end by means of which the bolt may be turned into place. The base of the head is provided with an enlarged shoulder 20, the outer lower surface of which is rounded and inclined to provide a cam face 21 of a size adapted to fit into the opening 11 and bear against the shoulder 12, so that as the nut is turned up into the hub, the cam face 21 will bind against the shoulder 12 and compress the boss, either 13 or 14, and thus securely bind the wheel body to the hub, and at the same time provide means for centering the boss about the cam shoulder 21 as the nut is seated. It is apparent that since the wall 12 of the opening 11 is inclined and tapers inwardly, and that as the shoulder 21 also tapers inwardly, that the turning up of the bolt will bring the wall 12 and the shoulder 21 into proper coaxial alignment, and will thus move the boss and its wheel part into the proper aligned position with respect to the axis of the bolt, which is carried by the hub.

Figure 1:
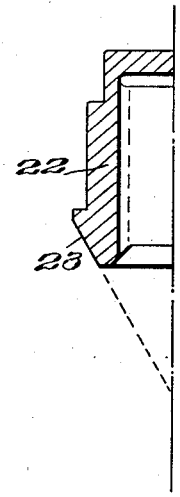

When the nut 22, as shown in Figure 1, is used, it may be provided internally with any suitable threaded portion for engagement with the ordinary bolt, and the nut 22 has a base portion 23, which is frusto-conical and of substantially the same inclination as that of the wall 12 in the wheel boss, so that as the nut 22 is turned up upon its bolt, the shoulder 23 will act against the wall 12 in the manner described in connection with the shoulder 21 of Figure 2, and will serve to shift and center the boss, and the wheel part carrying the boss into proper coaxial alignment with the bolt. The shoulders 21 and 23 extend circumferentially and entirely about their respective abutments, so that whether the nut 22 or the head 19 be used, the same effect may be obtained.

Where the sheet metal body part 24 of the wheel is relatively thin, or where it is desired to protect the same, the edge portion thereof at the boss may be reinforced by the provision of a bushing 25 in the form of a ring, which is rolled over outwardly, and at its upper and lower edges, to impart a substantially U-shaped cross section to the ring, adapted to fit around and over the marginal edge portion of the opening 11. The inner surface of the ring is adapted to receive the shoulder of the abutment and to take up wear and friction incident to the turning of the abutment into and out of binding position.

Figure 6:
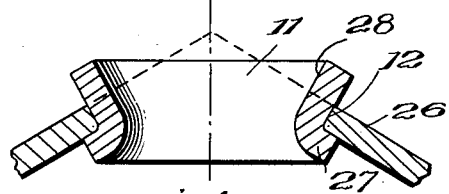
Figure 6 is a similar view showing a modified construction of the bushing or wearing ring.

The modified disclosure in Figure 6 shows the boss 26 provided with a bushing 27, which is flanged at its lower edge beneath the boss 26 at the wall 12 of the opening 11. The upper portion of the bushing flares upwardly and outwardly to provide a relatively long bearing wall 28, against which the shoulder of the abutment is adapted to work.

In all forms of the invention thereof, when the abutment is advanced toward and into the opening 11 of the boss, the boss is centered with respect to the bolt, and the boss yields sufficiently to effect a desired tensional and frictional contact between the boss and the abutment. This insures a proper registry of the parts, a proper fitting of the parts to admit expansion and contraction, and prevents the abutment from coming loose with respect to the boss, providing a means for accurately registering the wheel parts together when assembled, and also provides means for taking up traction strains incident to the driving of the wheel from the vehicle, or the braking effect on the wheel incident to tractive effort between the roadway and the tire of the wheel.

It will be obvious that many changes in the construction, combination and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:—

1. In a demountable wheel, a hub having a flat face, a wheel body placed against said flat face and having out-turned portions with the inner wall bent away from the flat hub portion and forming spaces between said portions and the flat face of the hub whereby to permit yielding of the out-turned portions toward the hub, such out-turned portions having openings therein with inclined walls disposed at substantially right angles to the inclination of the portion walls, and abutments having inclined shoulders to seat against the inclined walls of the openings.

2. In a demountable wheel, a hub having a flat face, a wheel body placed against said flat face and having out-turned portions with the inner wall bent away from the flat hub portion and forming spaces between said portions and the flat face of the hub whereby to permit yielding of the out-turned portions toward the hub, such out-turned portions having openings therein, and bushings in said openings having parts overlapping the walls of said out-turned portions, and abutments having inclined shoulders adapted to seat directly against said bushings.

3. In a demountable wheel, a hub having a flat face, a wheel body placed against said flat face and having out-turned portions with the inner wall bent away from the flat hub portion and forming spaces between said portions and the flat face of the hub whereby to permit yielding of the out-turned portions toward the hub, such out-turned portions having openings therein with inclined walls disposed at substantially right angles to the inclination of the portion walls, bushings in said openings engaging said inclined walls and having inner flanges for overlapping the out-turned walls of said portion, said bushings also having inner inclined walls substantially parallel with the inclined walls of the opening and extending both inwardly and outwardly beyond the edges of the inclined walls of the opening whereby to provide extensive frusto-conical seats, and abutments having inclined shoulders for taking against said frusto-conical seats with binding pressure whereby to relatively center the abutments and wheel bodies and to yieldably compress the resilient out-turned portions toward the flat hub surfaces.

4. A wheel structure comprising a standard unrecessed hub having a flat face exposed outwardly, a disc wheel body of resilient material placed against said flat unrecessed hub and supported against binding thereby, said wheel body having an opening therethrough, the resilient material of the disc wheel body about said opening being for an extensive diameter pressed outwardly of the plane of the wheel body away from the flat face of the hub whereby to produce a relatively large space between such flat face of the hub and the outwardly pressed portion of the wheel body in which to permit of the flexing of the pressed out portion of the wheel body, the opening in the pressed out portion of the wheel body being so constructed and arranged as to contract in diameter on the flexing of the pressed out portion toward the flat face of the hub, said flat face of the hub supporting the outwardly pressed portion of the wheel body against abrupt binding, the wall of the opening being at substantially right angles to the plane of the pressed out portion, and an abutment having an inclined or rounded face for fitting snugly against the wall of the opening and acting to press the pressed out portion inwardly toward the flat face of the hub.

5. A wheel construction comprising a hub of standard form having a flat face disposed outwardly, a metallic flexible and resilient disc wheel body fitted against said flat face of the hub and having a bolt opening therethrough, the disc for an extensive diameter about said opening being pressed outwardly away from the flat face of the hub thus producing an enlarged boss and creating a space within the boss and externally of the hub for permitting of the movement of the boss into and out of the plane of the wheel body, said opening having a wall extending at substantially right angles to the plane of the material lying adjacent the opening, and a fastening member having an inclined face tapering in conformity substantially with that of the opening fitting against said opening and acting to compress the boss inwardly toward the hub with the opening closing upon the inclined part of the fastening member.

ANDRÉ JULES MICHELIN.